United States Patent [19]

Leonard

[11] 4,385,658
[45] May 31, 1983

[54] FLUID TEMPERATURE MEASURING DEVICE

[75] Inventor: Gary S. Leonard, Minoa, N.Y.
[73] Assignee: Carrier Corporation, Syracuse, N.Y.
[21] Appl. No.: 266,851
[22] Filed: May 26, 1981
[51] Int. Cl.³ .............................................. F28F 21/00
[52] U.S. Cl. ................................................ 165/11 R; 374/148; 236/93 R
[58] Field of Search ............... 165/11, 32, 39; 62/125, 62/130, 185, 201; 374/147, 148; 236/93 R; 137/551; 138/109, 104, 44

[56] References Cited

U.S. PATENT DOCUMENTS

| | | | |
|---|---|---|---|
| 2,645,116 | 7/1953 | Baxter | 374/148 |
| 2,655,351 | 10/1953 | Hytte | 165/11 |
| 3,556,204 | 1/1971 | Dehne | 165/39 |

Primary Examiner—Albert W. Davis, Jr.
Assistant Examiner—S. Dotson
Attorney, Agent, or Firm—Donald F. Daley; David L. Adour

[57] ABSTRACT

A fluid temperature measuring device, which includes a resistance temperature detector (RTD), is disclosed for measuring the temperature of a fluid flowing through one of several heat exchange conduits which empty into a channel of a heat exchanger of a refrigeration system. The device is simple, inexpensive, reliable, easy to replace, and may be used with a microprocessor control system for the refrigeration system.

5 Claims, 2 Drawing Figures

FLUID TEMPERATURE MEASURING DEVICE

BACKGROUND OF THE INVENTION

The present invention relates to heat exchangers and more particularly to heat exchangers for refrigeration systems. Specifically, the present invention relates to a fluid temperature measuring device for use with a heat exchanger of the type wherein a fluid to be heated or cooled is passed through heat transfer tubes which empty into a channel.

In a heat exchanger of the flooded evaporator type, having water which is cooled by flowing through heat transfer tubes which are immersed in refrigerant, it is desirable to monitor the temperature of the water in the tubes because freezing water can obstruct or possibly rupture a tube. The water may freeze due to refrigerant undercharging of the heat exchanger or during low load operating conditions. When undercharged more heat transfer occurs from the lower tubes in the heat exchanger than from the higher tubes because the lower tubes are covered with liquid refrigerant while the higher tubes may be only partially covered with liquid refrigerant. Therefore, the water in the lower tubes may be cooled to a temperature below their designed temperature operating range if the average water temperature in the heat exchanger is maintained at the design level. Also, during low load operating conditions the refrigerant level in the heat exchanger decreases, in part due to a decrease in the boiling action in the heat exchanger whereby some of the higher tubes in the heat exchanger are not covered by liquid refrigerant. Therefore, as occurs in the undercharged situation, more heat transfer takes place from the lower tubes in the heat exchanger and the danger of freezeup in these tubes is present.

A conventional temperature probe used to monitor the water temperature in a heat exchanger of the above-described type comprises a bulb containing an expandable fluid, such as a refrigerant, with a capillary tube connected to the bulb. The entire bulb of the probe is placed inside one of the heat transfer tubes which empty into a channel. The bulb may be held in place by a flexible metal clip or by forming the bulb in a resilient bow-shape so that the bulb must be flexed when inserted into the tube whereby the bulb holds itself in place in the tube after being inserted. The capillary tube of the probe is inserted through a wall of the channel and connects the bulb to an electronic control system located outside the channel. The temperature probe generates a pressure signal in response to the temperature of the fluid surrounding the bulb of the probe. A pressure transducer may change the pressure signal into a corresponding electrical signal for processing by the electronic control system, or the probe may be connected directly to a pressure switch.

Normally, the bulb of the temperature probe is inserted into one of the lower heat transfer tubes in the heat exchanger since the lower tubes are more likely to encounter freezeup problems for the reasons discussed previously. Also, the bulb of the probe is designed to provide frictional resistance to the flow of water through the tube in which it is inserted. This insures that the probe measures the lowest water temperature in the heat exchanger since restricting the water flow through the end of the heat transfer tube substantially reduces the water flow rate through this tube relative to the rate of water flow through the other tubes of the heat exchanger. Therefore, the water flowing through the tube having the bulb is cooled slightly more than the water flowing through the other tubes. If the probe senses a water temperature indicating a possible freezeup problem then the electronic control system responds to shut down the heat exchange system or to take other such appropriate steps.

One disadvantage of the conventional temperature probe is that to replace the bulb of the probe the channel of the heat exchanger must be drained and then opened to reach the bulb. Also, it is necessary to use a pressure transducer to interface the conventional temperature probe with an electronic control system if an action other than simple shutdown is to be controlled. Such a pressure transducer is costly and can present reliability problems.

Other kinds of temperature probes, other than the pressure type just described, are known for measuring the temperature of a fluid. However, the use of these probes with a heat exchanger for the present purposes is not easily accomplished. Usually, it is necessary to place a temperature sensing element of these probes directly into a tube rather than locate it in the channel. One reason for locating this element inside a tube is that there is a greater change in fluid temperature in an individual tube in the lower tubes of the heat exchanger than in the fluid temperature in the channel for a given freezeup condition or other such problem. The fluid in the channel is a mixture of the fluid from all the tubes and therefore may undergo only a small temperature change while the fluid temperature within the individual tube undergoes a larger change. Also, typically, the fluid temperature in the channel is controlled to be maintained at a constant level while the fluid temperature in the individual tubes is varying due to the operating conditions in the heat exchanger. The necessity for placing these other temperature probes inside a single tube presents the same placement and replacement problems as discussed with respect to the conventional pressure type temperature probe.

SUMMARY OF THE INVENTION

Therefore, an object of the present invention is to provide an inexpensive, reliable, and easy to replace means for measuring the temperature of a heat transfer fluid flowing through one of several heat transfer tubes which empty into a channel of a heat exchanger.

Another object of the present invention is to provide an inexpensive, reliable, and easy to replace means for measuring the temperature of a heat transfer fluid flowing through one of several heat transfer tubes which empty into a channel of a heat exchanger and for generating an electrical signal, corresponding to the measured temperature, which can be directly used by an electronic control system without the need for a transducer.

These and other objects of the present invention are attained by a device comprising a temperature sensing means and a diverter means. The temperature sensing means consists of a resistance temperature detector (RTD) having a temperature sensitive element which is located in a channel where heat transfer fluid, which flows through heat transfer tubes in a heat exchanger, is collected. The diverter means consists of a tube having a restricted section connected to a flared section. The restricted section is sized to snugly fit within an end of one of the heat transfer tubes which empty into the channel and to provide frictional resistance to the heat transfer fluid flowing through this tube. The flared section is positioned to surround the temperature sensitive element of the RTD so that substantially only the heat transfer fluid from the tube having the restricted section located therein contacts the temperature sensitive element of the RTD. The diverter tube may be sized relative to the dimensions of the channel whereby the tube is held captive at a selected location within the channel. Also, the flared section of the diverter tube may have at least one hole in its wall to allow the heat transfer fluid to flow freely from the heat transfer tube through the hole(s) in the diverter tube into the channel. The temperature sensing means is electrically connected to an electronic control system which responds to shut down the heat exchange system or take other such steps if a temperature beyond a selected temperature limit is sensed by the RTD.

BRIEF DESCRIPTION OF THE DRAWINGS

Other objects and advantages of the present invention will be apparent from the following detailed description in conjunction with the accompanying drawings, wherein like reference numerals refer to like elements, and in which.

DETAILED DESCRIPTION OF THE PREFERRED EMBODIMENT

Figure 1:
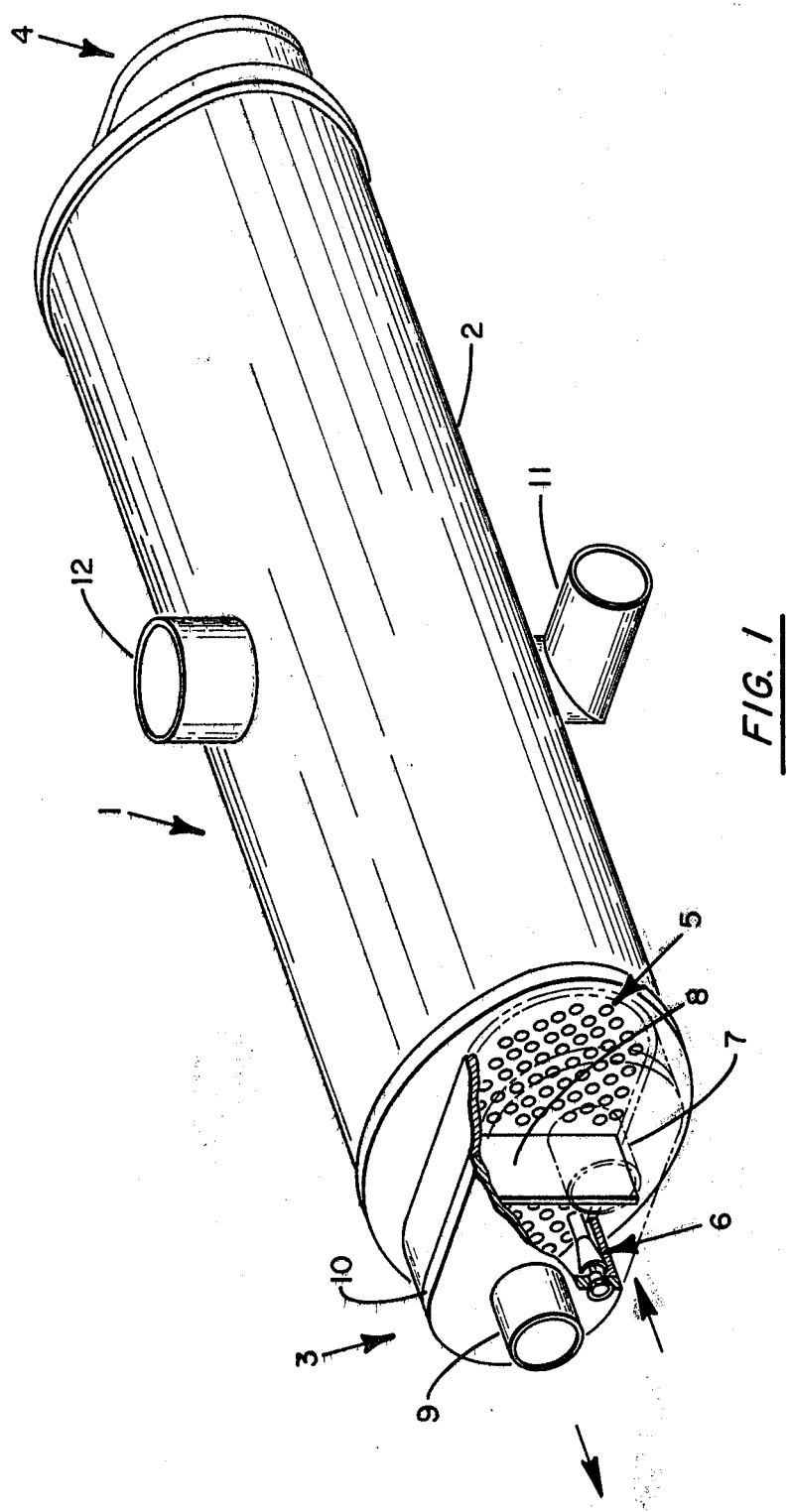
FIG. 1 shows a heat exchanger for use with an air conditioning system. The heat exchanger has water flowing through heat transfer tubes which empty into a channel having a fluid temperature measuring device, constructed according to the principles of the present invention, connected to one of the lower tubes in the heat exchanger.

Referring to FIG. 1, a heat exchanger 1 is shown which can be used with a chiller system, such as Carrier Corporation's Model 19DH hermetic centrifugal liquid chiller. The heat exchanger 1 comprises a shell 2 having a channel or inlet water box 3, a channel or return water box 4, a tube bundle 5, and a fluid temperature measuring device 6 which is constructed according to the principles of the present invention.

In operation, water which is to be cooled flows into and out of the inlet water box 3 through inlet pipe 7 and outlet pipe 9, respectively. As shown by the flow arrows in FIG. 1, the water is forced under pressure through the right side of the tube bundle 5 to a return water box 4 and returns to the inlet water box 3 through the left side of the tube bundle 5. The inlet water flow is restricted to the right side of the tube bundle 5 by the presence of a divider 8 located in the inlet water box 3. The return water box 4 has no divider. As the water flows through the tube bundle 5 a refrigerant is passed through the shell 2 of the heat exchanger 1 from the refrigerant inlet connection 11 to the refrigerant outlet 12. Heat from the water is transferred to the refrigerant in contact with the individual tubes of the tube bundle 5. The water is cooled as it passes through the right side of the tube bundle 5 and is cooled further as it passes back through the left side of the tube bundle 5. Therefore, water is at its lowest temperature when it returns to the inlet water box 3 after passing completely through the heat exchanger 1.

The fluid temperature measuring device 6, constructed according to the principles of the present invention, is located in one of the lower tubes on the left side of the tube bundle 5, as shown in FIG. 1. The temperature sensing element of the device 6 is inserted through the cover 10 of the inlet water box 3 and senses only the temperature of the water flowing through the tube with which it is connected. If the device 6 detects a temperature which may indicate a freezeup problem then an electronic control system (not shown) responds to shut down the chiller system or to take other such steps.

The temperature at which shutdown is set to occur is not necessarily the freezing temperature of water. The shutdown temperature may be selected to be slightly in excess of the freezing temperature of water to provide a safety margin. Of course, other shutdown temperatures will be selected if heat transfer fluids other than water are used in the tubes 5 of the heat exchanger 1.

Figure 2:
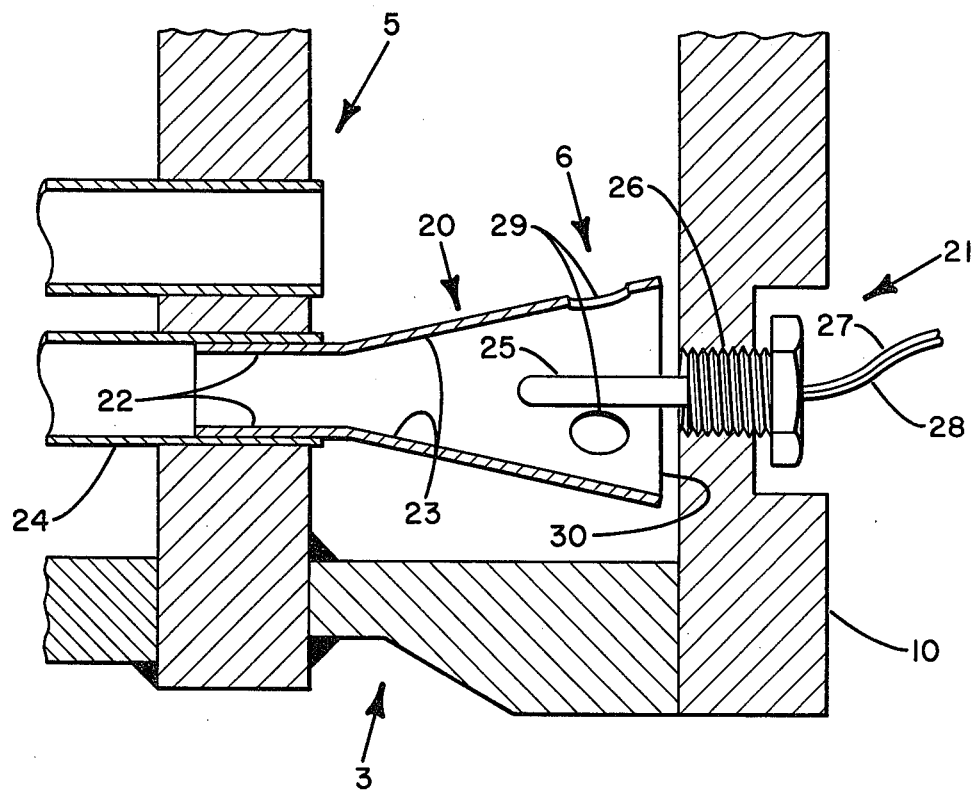
FIG. 2 shows an enlarged cross-section of part of the channel of the heat exchanger shown in FIG. 1 which has the fluid temperature measuring device, constructed according to the principles of the present invention, connected thereto.

As shown in FIG. 2, the fluid temperature measuring device 6 comprises a diverter means, such as a funnel-shaped conduit 20, and a temperature sensor 21. The funnel-shaped conduit 20 includes a restricted section 22 connected to a flared section 23. The funnel-shaped conduit 20 is configured so that its restricted section 22 can be inserted into a tube 24 which is one of the lower tubes in the tube bundle 5 of the heat exchanger 1 shown in FIG. 1. The funnel-shaped conduit 20 directs the heat transfer fluid, typically water, from the tube 24 to the temperature sensor 21.

Preferably, the temperature sensor 21 is a resistance temperature detector (RTD) having a temperature sensitive element 25 attached to a threaded part 26 having electrical leads 27 and 28. The leads 27, 28 are connected to the temperature sensitive element 25 and to an electronic control system which may include a microprocessor. The electrical signal from the temperature sensor 21 can be used directly by a microprocessor and is a direct indicator of the temperature measured by the temperature sensitive element 25. The RTD can be inserted through the cover 10 of the inlet water box 3 of the heat exchanger 1 and the threaded part 26 forms a tight seal with the cover 10. It is necessary to align the temperature sensitive element 25 with the end of the tube 24 but this is easily accomplished because the flared section 23 compensates for deviations from perfect alignment.

The particular temperature sensor 21 which is used is not critical to the operation of the present invention. However, the use of an RTD is preferred because, typically an RTD is reliable, inexpensive, and is easily interfaced with an electronic control system which includes a microprocessor. An important feature of using an RTD is that it eliminates the necessity for using a transducer such as is used with conventional pressure-type temperature probes. A further advantage of using an RTD as the temperature sensor 21 is that the RTD can be easily replaced.

In the construction shown in FIGS. 1 and 2, the RTD can be replaced by draining the inlet water box 3 of heat transfer fluid and then unscrewing the threaded part 26 from the cover 10 of the box 3. Another RTD can then be screwed in at the same location.

An alternative construction which eliminates the need for draining the inlet water box 3 is to use a separable well with the RTD. The separable well consists of a thin heat conducting material which is inserted through an opening in the cover 10 prior to screwing the RTD into position in the opening. The temperature sensitive element 25 of the RTD contacts the heat conducting material of the separable well and therefore senses the temperature of this material which is in direct thermal contact with the water within the inlet water box 3. One disadvantage of using a separable well is that it is necessary to establish good thermal contact between the heat conducting material of the separable well and the temperature sensitive element 25. This necessity is eliminated when the element 25 is in direct contact with the fluid within the inlet water box 3. Regardless of whether or not a separable well is used the steps required for replacing an RTD are an improvement over the steps required for replacing a conventional pressure-type temperature probe wherein draining of the water box 3 plus removal of the cover 10 is necessary before the probe can be replaced.

The temperature sensor 21 is designed to monitor the coldest water temperature in the heat exchanger 1 rather than obtaining the average water temperature in the water box 3. As discussed previously, the coldest water is expected in the leaving end of the lower tubes of the tube bundle 5 when an undercharged or low load condition exists. Also, during normal operation of the heat exchanger 1 the lower tubes in the tube bundle 5 typically have the coldest water flowing through them. For these reasons the temperature sensor 21 is placed at a position to monitor one of the lower tubes of the tube bundle 5.

As shown in FIG. 2, the funnel-shaped conduit 20 is inserted in the tube 24 whose fluid temperature is to be measured. The restricted section 22 of the funnel-shaped conduit 20 is configured to snugly fit within the tube 24 without allowing substantial amounts of fluid to flow around the restricted section 22. Also, the snug fit aids in holding the funnel-shaped conduit 20 in proper position. The restricted section 22 has a wall thickness chosen to provide a selected frictional resistance to the flow of fluid through tube 24. The amount of frictional resistance selected is chosen to slow the flow of fluid through the tube 24 relative to the rate of the flow of fluid through the other tubes in the tube bundle 5 to insure that the fluid flowing through the tube 24 is at the lowest temperature.

The flared section 23 is an extension of the restricted section 22 and is designed to surround the temperature sensitive element 25 of the sensor 21 so that the fluid flowing from the tube 24 through the funnel-shaped conduit 20 is substantially the only fluid in contact with the temperature sensitive element 25. Thus, it is only the temperature of the fluid from the tube 24 which is measured by the sensor 21.

If the funnel-shaped conduit 20 is fixed in position by attaching its restricted section 22 to the inside of the tube 24 then the fluid from the tube 24 may flow into the water box 3 through the opening 30 of the flared section 23 of the funnel-shaped conduit 20. Also, holes 29 in the wall of the flared section 23 may be provided to insure that there is always a free flow of fluid through the conduit 20. Preferably, the holes 29 are sized to have a combined cross-sectional area approximately equal to the cross-sectional area of the restricted section 22 of the funnel-shaped conduit 20. This allows an unobstructed flow of water through the funnel-shaped conduit 20 even if the opening 30 is closed off.

Preferably, the funnel-shaped conduit 20 is sized to prevent it from disengaging from the tube 24 rather than being attached to the tube 24. This is accomplished by choosing the length of the restricted section 22 and dimensions of the flared section 23 so that if the restricted section 22 is moved outwardly from the tube 24 the flared section 23 is pushed up against the cover 10 to prevent the funnel-shaped conduit 20 from disengaging from the tube 24. By configuring the conduit 20 in this manner the conduit 20 is designed to be substantially "free-floating". This allows a conduit 20 having a single-sized restricted section 22 to be used with a variety of tubes 24 which may vary slightly in internal diameter. For this "free-floating" construction, it is important that the funnel-shaped conduit 20 have holes 29 to allow the free flow of fluid from the conduit 24 into the inlet water box 3 when the flared section is pushed up against the cover 10.

The present invention has been described in conjunction with a heat exchanger of a refrigeration system but it should be noted that the present invention may be used in any situation where it is desired to measure the temperature of a fluid flowing through one of several conduits which empty into a collection chamber, such as a channel or water box. Therefore, while the present invention has been described in conjunction with a particular embodiment it is to be understood that various modifications and other embodiments of the present invention may be made without departing from the scope of the invention heretofore described and claimed in the appended claims.

What is claimed is:

1. A device for measuring the temperature of a fluid flowing through one of several heat exchange conduits which empty into a collection chamber comprising:
   temperature sensing means for generating electrical signals corresponding to the temperature of the fluid in contact with the temperature sensing means in the collection chamber; and
   diverter means for directing the fluid from the one conduit whose fluid temperature it is desired to measure into the collection chamber to contact said temperature sensing means substantially only with fluid from this one conduit.

2. The device as recited in claim 1 wherein said diverter means comprises a tube having a restricted section connected to a flared section, said restricted section configured for snug insertion into the end of the conduit whose fluid temperature it is desired to measure to provide a preselected frictional resistance to the fluid flowing from this one conduit into said restricted section, and said flared section configured to direct the fluid from the restricted section into contact with the temperature sensing means whereby substantially only fluid from the one conduit whose fluid temperature it is desired to measure contacts the temperature sensing means.

3. The device as recited in claim 2 wherein said tube has dimensions, relative to the dimensions of the collection chamber, for holding the tube captive when the tube is positioned having its restricted section inside the one conduit whose fluid temperature it is desired to measure and having its flared section located for directing fluid from the restricted section into contact with the temperature sensing means.

4. The device as recited in claim 3 wherein said tube has a flared section with at least one hole in the wall of the flared section of the tube, which is of sufficient cross-sectional area, relative to the cross-sectional area of the one conduit whose fluid temperature it is desired to measure, to allow the fluid flowing from this one conduit into the tube to flow freely through the hole(s) in the tube into the collection chamber.

5. The device as recited in claims 1, 2, 3 or 4 wherein said temperature sensing means comprises a resistance temperature detector.

* * * * *